United States Patent
Iwanami et al.

(10) Patent No.: US 7,458,220 B2
(45) Date of Patent: Dec. 2, 2008

(54) COMPLEX FLUID MACHINE

(75) Inventors: Shigeki Iwanami, Okazaki (JP); Keiichi Uno, Kariya (JP); Hironori Asa, Okazaki (JP); Tomohiro Kishimoto, Nishio (JP); Hiroshi Ogawa, Nagoya (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 429 days.

(21) Appl. No.: 11/233,301

(22) Filed: Sep. 22, 2005

(65) Prior Publication Data

US 2006/0073050 A1    Apr. 6, 2006

(30) Foreign Application Priority Data

Oct. 5, 2004   (JP) .............................. 2004-292945
Jul. 4, 2005   (JP) .............................. 2005-195536

(51) Int. Cl.
*F01K 25/00*   (2006.01)
*F01C 1/02*   (2006.01)

(52) U.S. Cl. ...................... 60/671; 418/55.1; 418/215; 418/216

(58) Field of Classification Search ........... 60/670–671; 418/55.1–55.6, 215, 216
See application file for complete search history.

(56) References Cited

U.S. PATENT DOCUMENTS

| | | | |
|---|---|---|---|
| 6,506,512 B1 * | 1/2003 | Mori et al. | 429/34 |
| 6,579,080 B1 * | 6/2003 | Spinnler | 418/55.2 |
| 6,928,820 B2 * | 8/2005 | Inaba et al. | 60/618 |
| 7,028,475 B2 * | 4/2006 | Iwanami et al. | 60/597 |
| 7,076,963 B2 * | 7/2006 | Higashiyama | 62/228.3 |
| 2003/0152467 A1 | 8/2003 | Higashiyama et al. | |
| 2004/0184923 A1 | 9/2004 | Iwanami et al. | |
| 2004/0187506 A1 * | 9/2004 | Iwanami et al. | 62/236 |

FOREIGN PATENT DOCUMENTS

JP    08-086289    4/1996

* cited by examiner

*Primary Examiner*—Hoang M Nguyen
(74) *Attorney, Agent, or Firm*—Harness, Dickey & Pierce, PLC

(57) ABSTRACT

A complex fluid machine (100) comprises a compressor device (110) for a refrigerating cycle (20) and an expansion device (120) for Rankine cycle (30) to collect waste heat from an engine (10) and convert into a rotational force, wherein the compressor device (110) and the expansion device (120) are arranged in a fluid machine housing (111, 101c, 121), but those devices (110, 120) are operatively independent from each other. The compressor and expansion devices (110, 120) are formed as scroll type devices, and each of the fixed scroll wraps (112b, 122b) are formed at a common base plate (101) and extend in opposite directions.

9 Claims, 4 Drawing Sheets

COMPLEX FLUID MACHINE

CROSS REFERENCE TO RELATED APPLICATION

This application is based on Japanese Patent Application Nos. 2004-292945 and 2005-195536, which are respectively filed on Oct. 5, 2004 and Jul. 4, 2005, the disclosures of which are incorporated herein by reference.

FIELD OF THE INVENTION

The present invention relates to a complex fluid machine having a compressor device for compressing and pumping out working fluid, and an expansion device for outputting mechanical energy by expanding the working fluid operating in Rankine cycle, wherein the compressor device is preferably used for compressing refrigerant in a refrigerating cycle for an automotive air conditioner.

BACKGROUND OF THE INVENTION

A complex fluid machine, in which a compressor device and an expansion device are integrally formed, is known in the art, for example as shown in Japanese Patent Publication No. H8-86289 (in which a rotating machine of a rolling type piston is shown). A compressor device thereof is used for compressing refrigerant in a refrigerating cycle, whereas an expansion device is operated by working fluid in Rankine cycle.

The compressor device is connected in series with the expansion device, wherein axes of both devices are connected with each other directly or indirectly by a connecting means, such as a magnet coupling. A driving motor and a circulating pump are connected on a side of the expansion device or the compressor device.

The expansion device of the above complex fluid machine is operated by the driving motor for a predetermined time period at an initial stage of the expansion operation (that is a time period during which an operation of the expansion device becomes stable), and then operated by the expansion of the working fluid (high temperature and high pressure gas) in Rankine cycle, so that a driving force (mechanical energy) is generated at its output shaft. The driving force is transmitted to the compressor device through the magnet coupling (or directly) to operate the compressor device. The compressor device compresses the refrigerant in the refrigerating cycle. The circulating pump is operated by the driving force generated at the expansion device to circulate the working fluid in Rankine cycle.

In the above prior art complex fluid machine, a conventional compressor device and a conventional expansion device are simply connected in series. Therefore, such fluid machine needs a space in its longitudinal direction, and has a disadvantage in that it is rather difficult to mount the fluid machine at a desired place of a system, which comprises Rakine cycle and a refrigerating cycle.

Furthermore, since the compressor device and the expansion device are connected with each other by a shaft, each of the devices can not operate independently from the other device. For example, when waste heat for a temperature control of components (e.g. an automotive engine) will be used as a heating source for working fluid in Rankine cycle, in order to effectively use the energy, it is desirable to operate only the expansion device, whereas the compressor device is not operated. However, such an independent operation of the expansion device is not possible in the conventional fluid machine, because the expansion device and the compressor device are connected with each other by the shaft, as described above. As a result, an effective collection of the waste heat from the engine can not be achieved.

SUMMARY OF THE INVENTION

The present invention is made in view of the above problems. It is, therefore, an object of the present invention to provide a complex fluid machine having a compressor device and an expansion device, wherein the complex fluid machine allows flexibility for the design so that the fluid machine can be easily mounted to the automotive vehicle, and the compressor device and the expansion device can be independently operated from each other.

According to a feature of the present invention, a complex fluid machine (100) comprises; a compressor device (110) provided in a refrigerating cycle (20) for compressing and pumping out working fluid upon receiving a driving force from an outside driving source (10), such as an engine; an expansion device (120) provided in Rankine cycle for generating a driving force by expansion of working fluid; a middle housing (101c) interposed between a compressor housing (111) and an expansion housing (121); and a common base plate (101) formed in the middle housing (101c).

In the above fluid machine, the compressor device (110) and the expansion device (120) are formed as scroll type devices, each of the devices has a fixed scroll (112, 122), each of the fixed scrolls (112, 122) has a fixed scroll wrap (112b, 122b) formed at the common base plate(101), and each of the fixed scroll wraps(112b, 122b) extend from the common base plate (101) in opposite directions.

According to the above complex fluid machine, the number of the base plates at which the fixed scrolls are formed can be reduced, so that a longitudinal length of the fluid machine can be made smaller. Therefore, the fluid machine can be mounted to an automotive vehicle more easily. Furthermore, the compressor device and the expansion device can be independently operated from each other since they are not connected with each other.

According to another feature of the present invention, an ON-OFF switching device (130) is provided at a compressor shaft (114) of the compressor device (110) for connecting or disconnecting the compressor device (110) with the outside driving source (10), and an electric power generating device (140) is provided at an expansion shaft (124) of the expansion device (120).

According to the above feature, the compressor device can be operated by the driving force from the outside driving source (e.g. the engine), whenever the operation of the compressor device becomes necessary. Furthermore, the electric power can be generated at the electric power generating device by the driving force generated at the expansion device. Therefore, the waste energy can be easily collected as the electric energy.

According to a further feature of the present invention, a compressor discharge passage (101a) for the compressor device (110) and an expansion suction passage (101b) for the expansion device (120) are respectively formed in the common base plate (101), and each one end of the passages (101a, 101b) is opened at an outer peripheral portion of the common base plate (101).

According to the above feature, the compressor discharge passage (101a) and the expansion suction passage (101b) can be easily formed in the common base plate (101), while keeping the effect of reducing the longitudinal length of the fluid machine.

According to a still further feature of the present invention, the maximum volume of a working chamber (Ve) of the expansion device (120) is made smaller than that of a working chamber (Vc) of the compressor device (110).

According to the above feature, the operational efficiency of the expansion device is increased. In most cases, the operational pressure of the working fluid for the Rankine cycle is made higher than that for the refrigerating cycle, and thereby the total operational volume of the working fluid becomes relatively smaller in the Rankine cycle. When the maximum volume of the working chamber for the expansion device is made smaller than that for the compressor device, corresponding to the decreased operational volume of the working fluid, the rotational speed of the expansion device can be prevented from being decreased, so that an amount of leakage of the working fluid for each revolution of the expansion device can be reduced. Accordingly, the operational efficiency of the expansion device 120 is increased.

According to a still further feature of the present invention, the electric power generating device (140) is provided with a function of an electric motor, wherein the electric power generating device (140) is rotated in a reversed direction when it is operated as the electric motor, and switching devices (41, 42) are respectively provided in the refrigerating cycle (20) and Rankine cycle (30), so that a flow direction of the refrigerant to the expansion device (120) is reversed when the expansion device (120) is operated as a compressor.

According to the above feature, the refrigerating cycle can be operated, even when the compressor device can not be operated by the driving force from the outside driving source (e.g. the engine). According to the present invention, the expansion device can be easily used as the compressor, because the expansion device is formed as the scroll type device.

According to a still further feature of the present invention, a check valve (118a) is provided at the compressor discharge passage (101a) for preventing the refrigerant from flowing back into a working chamber (Vc) of the compressor device (110), so that the refrigerant can be surely pumped out from the compressor device.

According to a still further feature of the present invention, a switching valve device (128) is provided at the expansion suction passage (101b) for opening and closing the expansion suction passage (101b), so that the start and stop of the operation for the expansion device can be surely performed. The switching valve device can be simply formed from an electromagnetic valve (128b) controlled by a signal from an outside control device to open and close its passage, and a sliding valve body (128a) moved by fluid pressures applied to both axial ends thereof, wherein one of the fluid pressure to be applied to the sliding valve body is controlled by an on-off operation of the electromagnetic valve (128b).

According to a still further feature of the present invention, a bypass discharge passage (129a) is formed in the common base plate (101), one end of which is communicated with the expansion suction passage (101b) formed in the common base plate (101), and the other end of which is opened at an outer peripheral portion of the common base plate (101), and a check valve (129b) is provided at the bypass discharge passage (129a) for preventing the refrigerant from flowing back into a working chamber (Ve) of the expansion device (120) when the expansion device (120) is operated as a compressor. Accordingly, the refrigerant can be surely pumped out from the expansion device, when it is operated as the compressor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
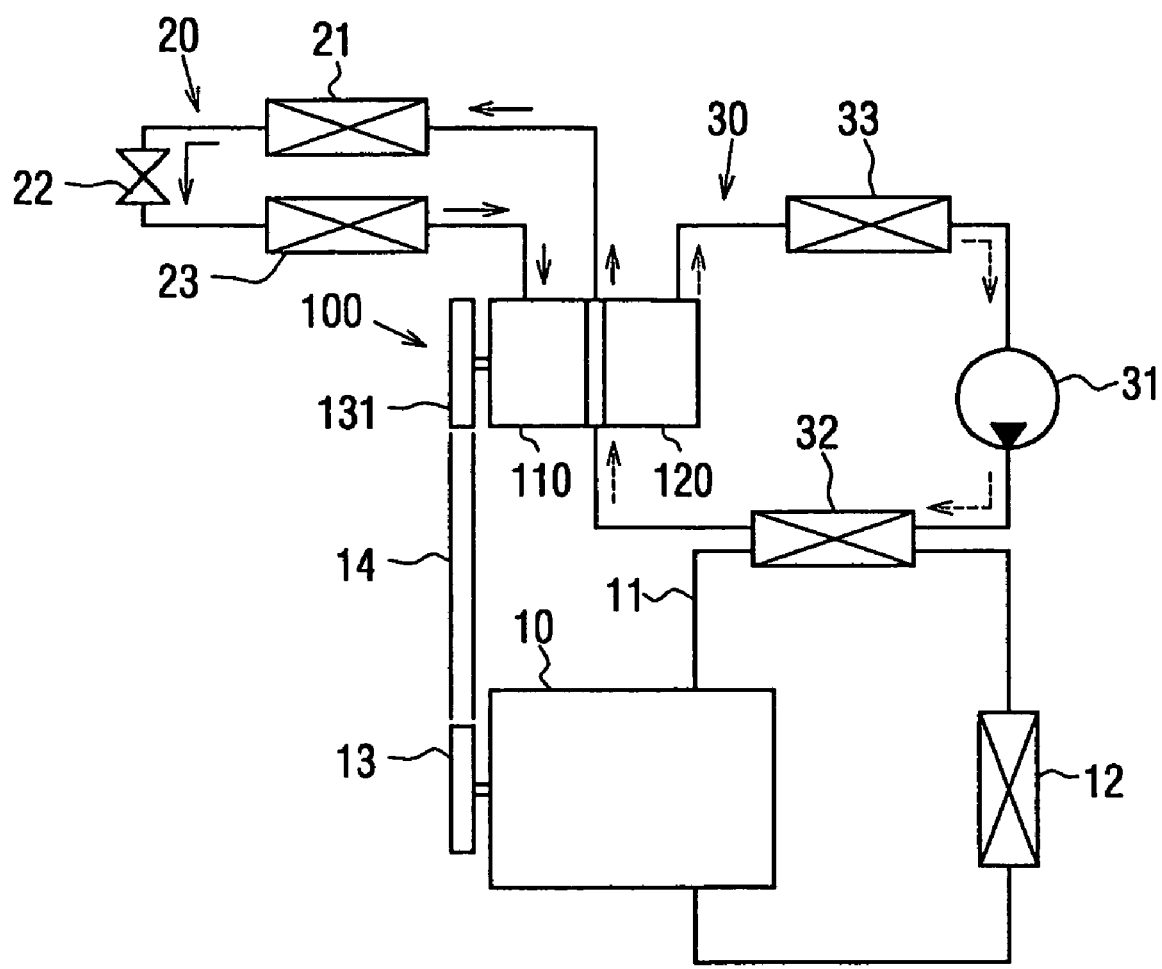
FIG. 1 is a schematic view showing a system structure according to a first embodiment of the present invention.
Figure 2:
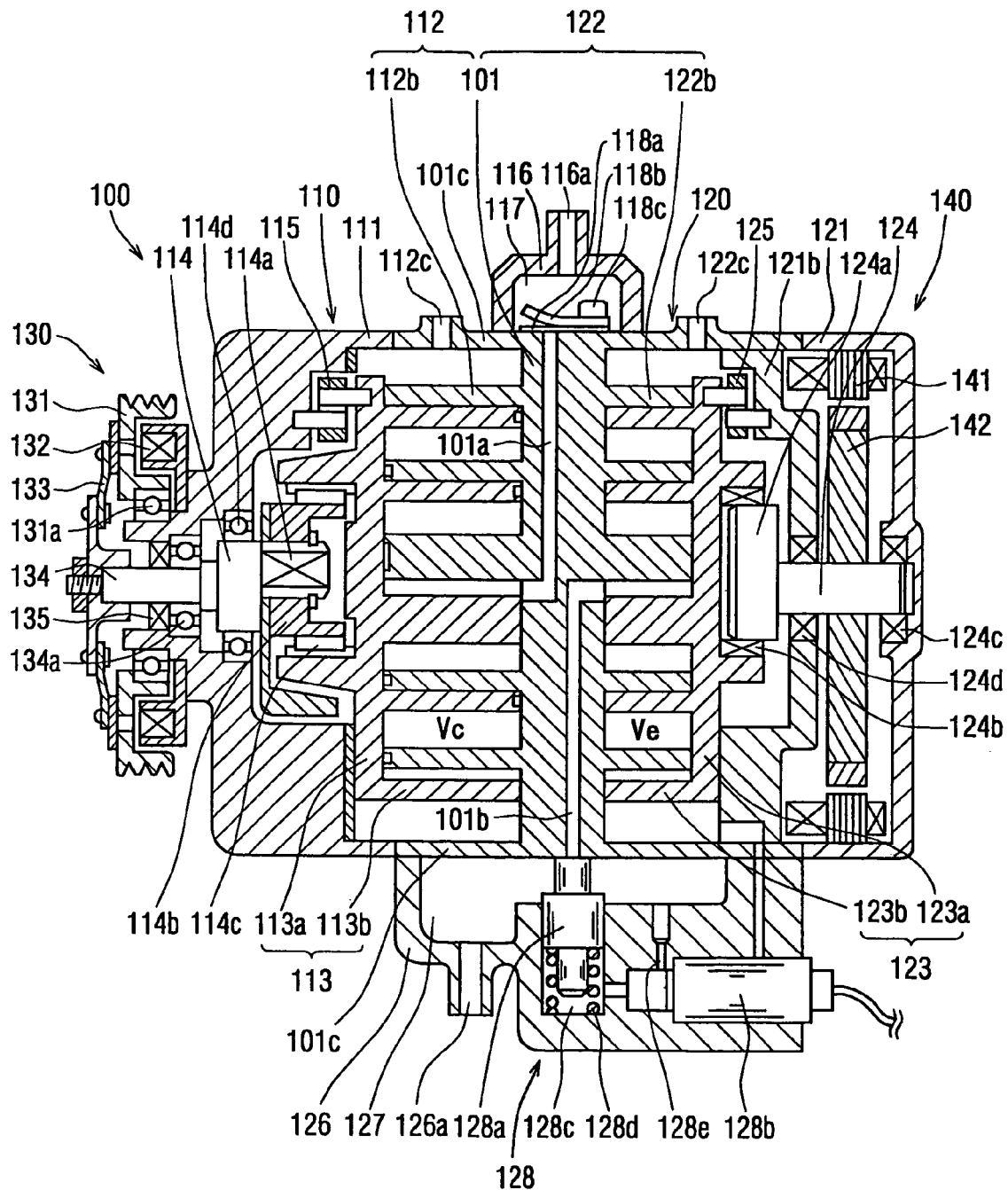
FIG. 2 is a cross sectional view showing a complex fluid machine according to the first embodiment.

A first embodiment of the present invention is shown in FIGS. 1 and 2, wherein FIG. 1 shows a schematic view of a system structure and FIG. 2 shows a cross sectional view of a complex fluid machine 100.

The complex fluid machine (a compressor and expansion device) 100 is used for an air conditioner (a refrigerating cycle 20) for an automotive vehicle, which is driven by an engine 10. Rankine cycle 30 is provided in the refrigerating cycle 20.

The engine 10 is a water cooled type internal combustion engine, and has a cooling water circuit 11 for circulating engine cooling water. A radiator 12 is provided in the cooling water circuit 11, at which the engine cooling water is cooled down to control the engine 10 at a predetermined temperature.

The refrigerating cycle 20 having the fluid machine 100 comprises a compressor device 110 for compressing gas-phase refrigerant (working fluid) and discharging the compressed refrigerant, a condenser 21 for cooling down and condensing the refrigerant discharged from the compressor device 110, a depressurizing device 22 for depressurizing and expanding the refrigerant liquidized in the condenser 21, and an evaporator 23 for evaporating the refrigerant depressurized by the depressurizing device 22, so that air passing through the evaporator is cooled down by the evaporative latent heat. The above components are connected in a closed circuit.

The Rankine cycle 30 collects waste heat energy (heat energy of the engine cooling water) generated at the engine 10, and converts the waste heat energy into mechanical energy. The Rankine cycle 30 comprises a liquid pump 31, a heating device 32, an expansion device 120 of the complex fluid machine 100, and a condenser 33, which are connected in a closed circuit.

The liquid pump 31 circulates the refrigerant (the working fluid) in the Rankine cycle 30. The heating device 32 is a heat exchanger for heating the refrigerant through heat exchange between the refrigerant circulated by the liquid pump 31 and the high temperature engine cooling water flowing through the cooling water circuit 11. The expansion device 120 is a fluid machine for generating a driving force by the expansion of the super heated vaporized refrigerant heated at the heating device 32. The condenser 33 is a heat exchanger for cooling down and liquidizing the refrigerant discharged from the expansion device 120. An electrical pump is used as the liquid pump 31 in the embodiment, and is operated by an electronic control unit (not shown).

A detailed structure of the fluid machine 100 is explained with reference to FIG. 2. The fluid machine 100 comprises the compressor device 110 for compressing and pumping out the refrigerant in the refrigerating cycle 20, the expansion device 120 for generating the driving force by the expansion of the refrigerant in the Rankine cycle 30, an electromagnetic clutch 130 (an ON-OFF switching device) for selectively transmitting an outside driving force from the engine 10 to the compressor device 110, and an electric power generating device 140 for generating electric power by the driving force generated at the expansion device 120.

Each of the compressor device 110 and the expansion device 120 is formed as a scroll type device, each having a fixed scroll 112 and 122 and a movable scroll 113 and 123. Each of the compressor and expansion devices 110 and 120 is housed in respective spaces defined by a compressor housing 111, expansion housing 121 and a middle housing 101*c*. The middle housing 101*c* is formed at an outer periphery of a common base plate 101, at which the fixed scrolls 112 and 122 are formed, and the middle housing 101*c* are formed into a cylindrical shape, wherein its open ends respectively extend in directions to respective base plate portions 113*a* and 123*a* of the movable scrolls 113 and 123. A compressor shaft 114 and an expansion shaft 124 are respectively provided at the movable scrolls 113 and 123.

Each of the fixed scrolls 112 and 122 has a vortical scroll wrap 112*b* and 122*b* extending from the common base plate 101 toward the respective movable scrolls 113 and 123. In the embodiment, the base plate 101 is commonly used as the base plate for the fixed scrolls 112 and 122 of the compressor and expansion devices 110 and 120.

The fixed scroll 112 of the compressor device 110 is formed from the base plate 101 and the vortical scroll wrap 112*b* extending from the base plate 101 toward the movable scroll 113. The movable scroll 113 is formed from the base plate portion 113*a* and a vortical scroll wrap 113*b* extending from the base plate portion 113*a* toward the fixed scroll 112 so that the vortical scroll wrap 113*b* is engaged with the vortical scroll wrap 112*b*. A working chamber Vc is formed between the fixed scroll 112 and the movable scroll 113, which are operatively contacted with each other. The volume of the working chamber Vc is changed when the movable scroll 113 is rotated with respect to the fixed scroll 112 (moves around the fixed scroll). The volume of the working chamber Vc becomes smaller, as the working chamber is moved from its outside portion toward its center.

The compressor shaft 114 is a crank shaft, which has an eccentric portion 114*a* eccentric with respect to a rotational center of the shaft 114, and which is rotationally supported by a bearing 114*d* fixed to the compressor housing 111. The eccentric portion 114*a* is connected to the movable scroll 113 via a bushing 114*b* and a bearing 114*c*.

A self rotation prevention mechanism 115 is provided to the movable scroll 113, wherein the movable scroll 113 is prevented from rotating on its axis and the rotation around the rotational center of the compressor shaft 114 is achieved in accordance with the rotation of the compressor shaft 114.

A compressor inlet port 112*c* is formed at the middle housing 101*c*, wherein the compressor inlet port 112*c* is communicated with the working chamber Vc and the refrigerant is sucked into the working chamber depending on the positions of the scroll wraps 112*b* and 113*b* of the fixed and movable scrolls 112 and 113. The compressor inlet port 112*c* is connected to the evaporator 23.

A compressor discharge passage 101*a* is formed in the base plate 101, wherein one end of the passage 101*a* is communicated with the working chamber Vc at such a position (the center portion) at which the volume becomes to its minimum value during the compressing operation of the compressor device 110. The other end of the compressor discharge passage 101*a* is opened to the outside of the base plate 101.

A compressor discharge housing 116 is provided at the outside of the middle housing 101*c*, to form a high pressure chamber 117 between the outside of the middle housing 101*c* and the compressor discharge housing 116, wherein the other end of the compressor discharge passage 101*a* is opened to the inside space of the high pressure chamber 117. A compressor outlet port 116*a* is formed at an outer side of the compressor discharge housing 116, and connected to the condenser 21. The compressor discharge passage 101*a*, the high pressure chamber 117 and the compressor outlet port 116*a* are communicated in this order. The high pressure chamber 117 has a function for smoothing pulsation of the refrigerant pumped out from the compressor device 110.

A discharge valve 118*a* is provided at the compressor discharge passage 110*a*. The discharge valve 118*a* is formed in the high pressure chamber 117 and at the opening end of the compressor discharge passage 101*a*. The discharge valve 118*a* is a check valve formed from a reed valve for preventing the refrigerant from flowing back from the high pressure chamber 117 into the working chamber Vc. The reed valve 118*a* as well as a stopper 118*b* for restricting a maximum opening degree of the reed valve 118*a* is fixed to the middle housing 101*c* by a bolt 118*c*.

The expansion device 120 is arranged to be in series with (but not operatively connected with) the compressor device 110. The inside space defined by the middle housing 101*c* and the expansion housing 121 is divided into two spaces by a partitioning wall 121*b*. The expansion device 120 is arranged in the (left-hand side) space on a side to the compressor device 110. The fixed scroll 122 of the expansion device 120 is formed from the base plate 101 and the fixed scroll wrap 122*b*, wherein the fixed scroll wrap 122*b* is formed to extend from the base plate 101 in an opposite direction to the scroll wrap 112*b* of the fixed scroll 112 of the compressor device 110.

The movable scroll 123 is formed from the base plate portion 123*a* and a vortical scroll wrap 123*b* extending from the base plate portion 123*a* toward the fixed scroll 122 so that the vortical scroll wrap 123*b* is engaged with the vortical scroll wrap 122*b*. A working chamber Ve is formed between the fixed scroll 122 and the movable scroll 123, which are operatively contacted with each other. The volume of the working chamber Ve is increased and/or decreased when the movable scroll 123 is rotated with respect to the fixed scroll 122 (moves around the fixed scroll). The volume of the working chamber Ve becomes larger, as the working chamber is moved from its center toward its outside portion.

A longitudinal dimension of the scroll wraps 122*b* and 123*b* for the scrolls 122 and 123 of the expansion device 120 is made smaller than a longitudinal dimension of the scroll wraps 112*b* and 113*b* for the scrolls 112 and 113 of the compressor device 110, whereas a dimension in a radial direction is designed to be equal to each other. Accordingly, the maximum volume of the working chamber Ve is designed to be smaller than that of the working chamber Vc.

The expansion shaft 124 is a crank shaft, which has an eccentric portion 124a eccentric with respect to a rotational center of the shaft 124, and which is rotationally supported by bearings 124c and 124d respectively fixed to the expansion housing 121 and the partitioning wall 112b. The eccentric portion 124a is connected to the movable scroll 123 via a bearing 124b. A self rotation prevention mechanism 125, which is similar to the self rotation prevention mechanism 115 for the compressor device 110, is provided to the movable scroll 123.

An expansion suction passage 101b is formed in the common base plate 101, through which the superheated vaporized refrigerant flows from the heating device 32 into the working chamber Ve. One end of the expansion suction passage 101b is opened to the outside of the base plate 101, whereas the other end thereof is communicated with the working chamber Ve at such a position (the center portion) at which the volume becomes to its minimum value during the suction operation of the expansion device 120. An expansion discharge port 122c is formed at the middle housing 101c, for discharging the expanded refrigerant from the working chamber Ve to the outside. The expansion discharge port 122c is connected to the condenser 33.

An expansion suction housing 126 is provided at the outside of the middle housing 101c, to form a high pressure chamber 127 between the outside of the middle housing 101c and the expansion suction housing 126, wherein the one end of the expansion suction passage 101b is opened to the inside space of the high pressure chamber 127. An expansion inlet port 126a is formed at an outer side of the expansion suction housing 126, and connected to the heating device 32. The expansion inlet port 126a, the high pressure chamber 127 and the expansion suction passage 101b are communicated in this order. The high pressure chamber 127 has a function for smoothing pulsation of the refrigerant sucked from the expansion inlet port 126a.

A switching valve device 128 is provided at the expansion suction passage 101b. The switching valve device 128 is an ON-OFF valve device for opening and/or closing the expansion suction passage 101b. The switching valve device 128 is provided in the high pressure chamber 127 and comprises a sliding valve body 128a, an electromagnetic valve 128b and so on.

The sliding valve body 128a is partly accommodated in a back pressure chamber 128c formed as a hole in the inside wall of the expansion suction housing 126. The sliding valve body 128a is movably held in the back pressure chamber 128c to open or close the opened end of the expansion suction passage 101b. The electromagnetic valve 128b is operated by a control signal from the electronic control unit (not shown), to control the pressure in the back pressure chamber 128c by controlling the communication between the back pressure chamber 128c and a low pressure side (a side of the expansion discharge port 122c).

A spring 128d is interposed between the sliding valve body 128a and the back pressure chamber 128c. The spring 128d is a biasing means for biasing the sliding valve body 128a in a direction of closing the expansion suction passage 101b. An orifice 128e is formed in a passage connecting the back pressure chamber 128c with the high pressure chamber 127, wherein the orifice 128e has a certain flow resistance.

When the electromagnetic valve 128b is opened by the signal from the electronic control unit (not shown), the pressure in the back pressure chamber 128c is released to the low pressure side (the side of the expansion discharge port 122c) and the pressure becomes lower than that in the high pressure chamber 127. The sliding valve body 128a is downwardly moved in FIG. 2, compressing the spring 128d, to open the expansion suction passage 101b. The pressure loss at the orifice 128e is extremely high, and thereby the flow amount of the refrigerant from the high pressure chamber 127 into the back pressure chamber 128c is negligible small.

When the electromagnetic valve 128b is closed by the signal from the electronic control unit (not shown), the pressure in the back pressure chamber 128c becomes equal to that of the high pressure chamber 127 through the orifice 128e. Then, the sliding valve body 128a is upwardly moved in FIG. 2 by the spring force of the spring 128d, to close the expansion suction passage 101b. As above, the sliding valve body 128a, the electromagnetic valve 128b, the back pressure chamber 128c, the spring 128d and the orifice 128e form an electrical switching valve of a pilot type, to open and close the expansion suction passage 101b.

The electromagnetic clutch 130 comprises a pulley 131, an excitation coil 132, a friction plate 133, a driving shaft 134 and so on. The pulley 131 is rotationally supported by a pulley bearing 131a fixed to the compressor housing 111, and drivingly connected to a crank pulley 13 (FIG. 1) of the engine 10 via a driving belt 14 (FIG. 1).

The excitation coil 132 is fixed to the compressor housing 111 for generating magnetic field when electric current is supplied thereto. The friction plate 133 is arranged to oppose to the excitation coil 132, wherein the pulley 131 is interposed between the friction plate 133 and the excitation coil 132. The friction plate 133 is displaced toward the pulley 131 by the magnetic field (the electromagnetic force) generated by the excitation coil 132.

The driving shaft 134 is rotationally supported by a bearing 134a fixed to the compressor housing 111, one end of which is connected to a center of the friction plate 133 and the other end is connected to the compressor shaft 114 of the compressor device 110. A lip seal 135 is provided at the driving shaft 134 to prevent the refrigerant from leaking to the outside of the compressor housing 111 through a gap between the driving shaft 134 and the compressor housing 111.

When the electric current is supplied to the excitation coil 132 from the electronic control unit (not shown), the friction plate 133 is attracted to the pulley 131, so that the compressor device 110 is connected with the engine (an outside driving source) 10. When the supply of the electric current is cut off, the compressor device 110 is disconnected from the engine 10.

The electric power generating device 140 is arranged in series with the expansion device 120, in the space defined by the partitioning wall 121b and the expansion housing 121. The electric power generating device 140 comprises a stator 141 fixed to an inner surface of the expansion housing 121 and a rotor 142 fixed on and rotated with the expansion shaft 124, wherein the stator 141 is a stator coil wound with wires, whereas the rotor 142 is a magnet rotor in which permanent magnets are fixed.

The electric power generating device 140 generates the electric power, when the rotor 142 is rotated by the driving force generated at the expansion device 120. The generated electric power is charged into a battery (not shown) by the control of the electronic control unit (not shown).

An operation and effects of complex fluid machine 100 according to the above first embodiment is explained.

When the compressor device 110 is connected to the engine 10 through the electromagnetic clutch 130 by the control of the electronic control unit (not shown), during the engine 10 is running, the movable scroll 113 is rotated by the outside driving force from the engine 10. The compressor device 110 sucks the refrigerant in the refrigerating cycle 20 into the working chamber Vc through the compressor inlet port 112c, compresses the refrigerant, and pumps out the compressed refrigerant from the compressor outlet port 116a through the compressor discharge passage 101a, the discharge valve 118a and the high pressure chamber 117. During this operation, the compressed high pressure refrigerant is prevented from flowing back from the high pressure chamber 117 into the working chamber Vc by means of the discharge valve 118a. The pumped out refrigerant flows into the evaporator 23 through the condenser 21 and the depressurizing device 22, as indicated by arrows of solid line in FIG. 1. The refrigerant is evaporated at the evaporator 23 to cool down the air passing therethrough. When it is not necessary to cool down the air, the supply of the electric current to the electromagnetic clutch 130 is cut off, to disconnect the compressor device 110 from the engine 10.

When the temperature of the engine cooling water has been increased to a sufficient high temperature as a result of the operation of the engine 10, the liquid pump 31 is operated by the electronic control unit (not shown) to start the circulation of the refrigerant in the Rankine cycle 30. The electromagnetic valve 128b of the expansion device 120 is opened, to downwardly (in FIG. 2) move the sliding valve body 128a to open the expansion suction passage 101b. The refrigerant is heated by the heating device 32 (by the high temperature engine cooling water) to become the superheated vaporized gas, and flows into the working chamber Ve through the expansion inlet port 126a, the high pressure chamber 127 and the expansion suction passage 101b. The movable scroll 123 is then rotated in accordance with the expansion of the superheated vaporized gas, to generate the driving (rotational) force at the expansion shaft 124.

The rotor 142 of the electric power generating device 140 is rotated by the driving force generated at the expansion shaft 124, to generate the electric power at the stator coil of the stator 141. The generated electric power is charged into the battery or supplied to other accessories (automotive parts) in the automotive vehicle. The expanded refrigerant in the working chamber Ve is discharged from the expansion discharge port 122c to return to the liquid pump 31 through the condenser 33, as indicated by arrows of dotted line in FIG. 1.

In the case that the temperature of the engine cooling water has not yet increased to the sufficiently high temperature, or in the case that the battery has been fully charged, the operation of the liquid pump 31 is stopped and the electromagnetic valve 128b is closed, so that the sliding valve body 128a is upwardly (in FIG. 2) moved to close the expansion suction passage 101b. The flow of the refrigerant is stopped to stop the operation of the Rankine cycle 30.

Since the base plate 101 is commonly used for the fixed scrolls 112 and 122, according to the embodiment, the longitudinal length of the compressor device 110 and the expansion device 120 (i.e. the longitudinal length of the entire complex fluid machine) can be made smaller, by decreasing the number of base plates, to thereby enhance a mounting performance of the fluid machine to the automotive vehicle. Furthermore, since the compressor device 110 and the expansion device 120 are operatively disconnected from each other, they can be independently operated.

The compressor discharge passage 110a and the expansion suction passage 101b are formed in the base plate 101, and each end of the passages 110a and 101b is opened at the outer peripheral portion (in the radial direction). In the conventional scroll type fluid machine, the discharge passage of the compressor device and the suction passage of the expansion device are generally formed in the base plate in such a manner that those passages penetrate through the base plate in an axial direction. When compared with such conventional fluid machine, the discharge passage 101a and the suction passage 101b can be formed without losing an effect of the shortened longitudinal length and without providing complicated passages.

Furthermore, the refrigerant can be surely discharged (pumped out) from the compressor device 110, because the discharge valve 118a is provided at the compressor discharge passage 101a. Furthermore, since the switching valve device 128 (the sliding valve body 128a and the electromagnetic valve 128b) is provided at the expansion suction passage 101b, the operation of the expansion device 120 can be surely started by introducing the superheated vaporized gas (refrigerant) into the working chamber Ve with the valve device opened, whereas the operation of the expansion device 120 can be surely stopped by. stopping the supply of the superheated vaporized gas (refrigerant) into the working chamber Ve with the valve device closed.

Furthermore, since the electromagnetic clutch 130 is connected to the compressor shaft 114, the compressor device 110 can be operated by the outside driving force from the engine 10, whenever the operation for the automotive air conditioner becomes necessary. Since the electric power generating device 140 is connected to the expansion shaft 124, the electric power generating device 140 can be operated by the driving force generated at the expansion device 120. The generated electric power is charged into the battery. The method of charging the generated electric power into the battery can be a simpler way for collecting the energy. This is the case, in particular when compared with such a case in which the generated mechanical energy (the driving force generated at the expansion device 120) is used as another mechanical energy (e.g. for assisting the power generation at the engine 10). An additional arrangement would become necessary in the above case, namely an arrangement between the expansion device side and engine side (e.g. the adjustment of the rotational speed between both of them) would be necessary.

Furthermore, operational efficiency of the expansion device 120 can be increased, because the maximum volume of the working chamber Ve for the expansion device 120 is made smaller than that of the working chamber Vc for the compressor device 110. The operational pressure of the working fluid for the Rankine cycle is generally made higher than that for the refrigerating cycle, and thereby the total operational volume of the working fluid becomes smaller in the Rankine cycle. When the maximum volume of the working chamber Ve for the expansion device 120 is made smaller than that for the compressor device 110, as in the present invention, corresponding to the decreased operational volume of the working fluid, the rotational speed of the expansion device 120 can be prevented from being decreased, so that an amount of leakage of the working fluid for each revolution of the expansion device can be reduced. Namely, according to the present invention, the expansion speed of the working fluid is made higher than the leakage speed of the working fluid, and thereby the operational efficiency of the expansion device 120 is increased.

Figure 3:
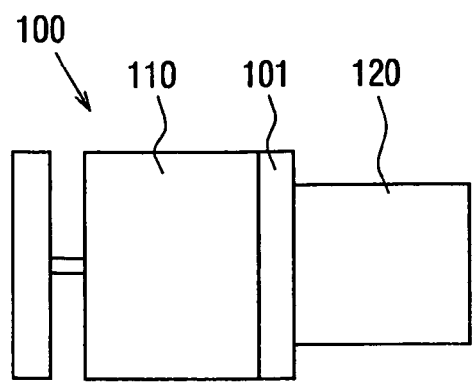
FIG. 3 is a schematic view showing a first modification of the complex fluid machine of the first embodiment.
Figure 4:
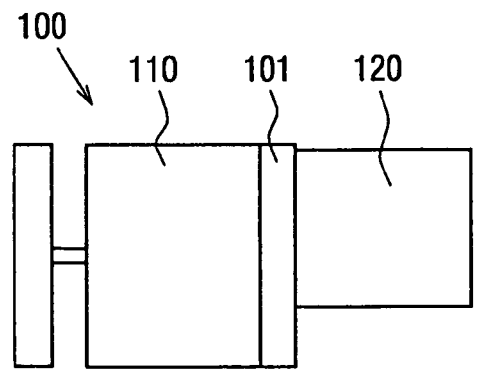
FIG. 4 is a schematic view showing a second modification of the complex fluid machine of the first embodiment.

The complex fluid machine 100 can be modified as shown in FIGS. 3 and 4, wherein FIG. 3 shows a first modification and FIG. 4 shows a second modification.

Namely, in FIG. 3, a radial dimension of the expansion device 120 is made smaller than that of the compressor device 110. The radial dimensions of the fixed and movable scrolls 122 and 123 are correspondingly made smaller, to make the maximum volume of the working chamber Ve for the expansion device 120 smaller than that of the working chamber Vc for the compressor device 110.

In FIG. 4, the rotational axis of the expansion device 120 is displaced in the radial direction from the rotational axis of the compressor device 110.

According to the above modifications, the complex fluid machine can have more design flexibility in the radial direction, in order to easily mount the fluid machine to the automotive vehicle.

Second Embodiment

Figure 5:
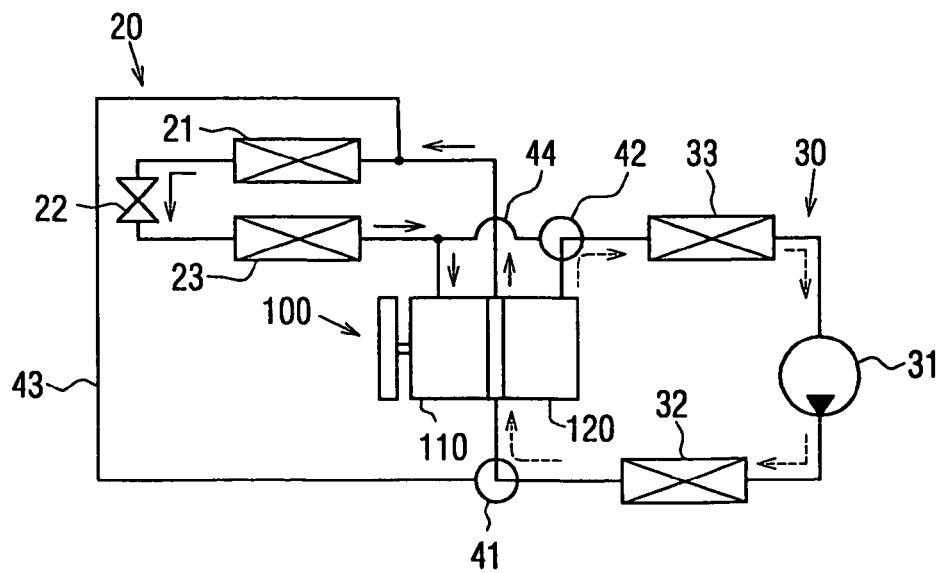
FIG. 5 is a schematic view showing a system structure according to a second embodiment, in which refrigerant flow during an engine operation is shown.
Figure 6:
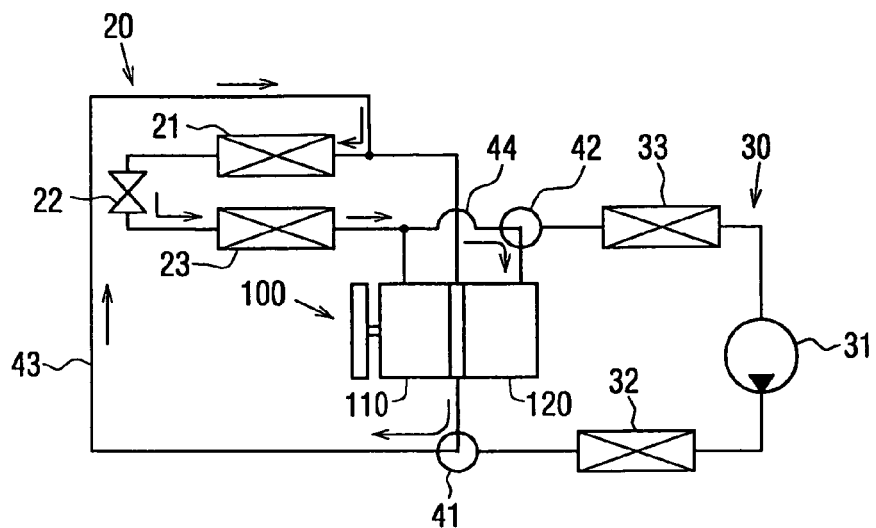
FIG. 6 is a schematic view showing the system structure according to the second embodiment, in which refrigerant flow during an non-operation of the engine is shown.

A second embodiment is shown in FIGS. 5 and 6, in which the complex fluid machine is applied to an automotive vehicle having a function of an idling stop (an engine operation is temporarily stopped depending on a traffic condition) or to a hybrid vehicle. The second embodiment differs from the first embodiment in that a function of an electric motor is added to the electric power generating device 140, fluid passages 43 and 44 are added, and switching devices (three way valves) 41 and 42 are provided.

In the electric power generating device (electrical rotating device) 140, when the electric power is supplied to the stator 141 from the electronic control unit (not shown), the rotor 142 is driven to rotate, to operate as the electric motor. When the electrical rotating device 140 is operated as the electric motor, the rotational direction of the expansion device 120 is reversed.

The fluid passage 43 is connected between a junction point between the heating device 32 and the expansion device 120 of the Rankine cycle 30 and a junction point between the compressor device 110 and the condenser 21 of the refrigerating cycle 20. The fluid passage 44 is connected between a junction point between the evaporator 23 and the compressor device 110 of the refrigerating cycle 20 and a junction point between the expansion device 120 and the condenser 33 of the Rankine cycle 30.

The three way valve 41 is provided at the junction point of the heating device 32, the expansion device 120 and the fluid passage 43. The three way valve 42 is provided at the junction point of the expansion device 120, the condenser 33 and the fluid passage 44. Each of the three way valves 41 and 42 is a switching valve for communicating two of the three passages with each other, and switching operation of those valves is controlled by the electronic control unit (not shown). The refrigerant used for the refrigerating cycle is identical to that for the Rankine cycle.

The switching positions of the three way valves 41 and 42 are positioned as shown in FIG. 5 (arrows of the solid lines and dotted lines) when the engine 10 is running in a normal operation. The operation of the compressor device 110 and the expansion device 120 is the same to that of the first embodiment.

The switching positions of the three way valves 41 and 42 are switched to the positions shown in FIG. 6 (arrows of the solid lines) when the operation of the engine 10 is stopped. The electrical rotating device 140 is operated as the electric motor (the rotational direction of the device 140 is reversed). The electromagnetic valve 128b of the expansion device 120 is opened, the sliding valve body 128a is downwardly moved (in FIG. 2), and the expansion suction passage 101b is opened.

Then, the expansion device 120 is started to operate as a compressor, wherein the refrigerant flows in the opposite direction to that for the expansion operation. Namely, the refrigerant flows (sucked) into the working chamber Ve through the expansion discharge port 122c, the refrigerant is compressed by the working chamber Ve, and pumped out from the expansion inlet port 126a through the expansion suction passage 101b and the high pressure chamber 127. The compressed refrigerant further flows to the fluid passage 43, the condenser 21, the depressurizing device 22, the evaporator 23 and the fluid passage 44, as shown by the arrows in FIG. 6. As a result, the air conditioning operation can be further performed by the operation of the expansion device 120, which is acting as the compressor.

As above, even in the case that the compressor device 110 can not be driven by the engine 10 due to its temporal stop, the expansion device 120 can be operated as the compressor to continuously operate the refrigerating cycle 20.

In the case that the expansion device 120 was formed as a piston type fluid machine having multiple pistons, it is necessary to adjust the timing of the refrigerant flowing into and pumping out of working chambers formed by the pistons and cylinders, so that the expansion device of the piston type can be used as the compressor in which the flow direction of the refrigerant is reversed.

However, since the expansion device 120 of the present invention is formed as the scroll type fluid machine, the expansion device 120 can be easily used as the compressor, without the necessity of adjusting the timing of the refrigerant flowing into or pumping out of the working chamber.

A time period, during which the refrigerating cycle 20 is operated by the expansion device 120 operating as the compressor while the engine operation is stopped, is generally short. Accordingly, the maximum volume of the working chamber Ve for the expansion device 120 (working as the compressor) can be also made smaller than that of the working chamber Vc for the compressor device 110, so that the operational efficiency of the complex fluid machine of the second embodiment can be likewise increased as in the first embodiment.

Figure 7:
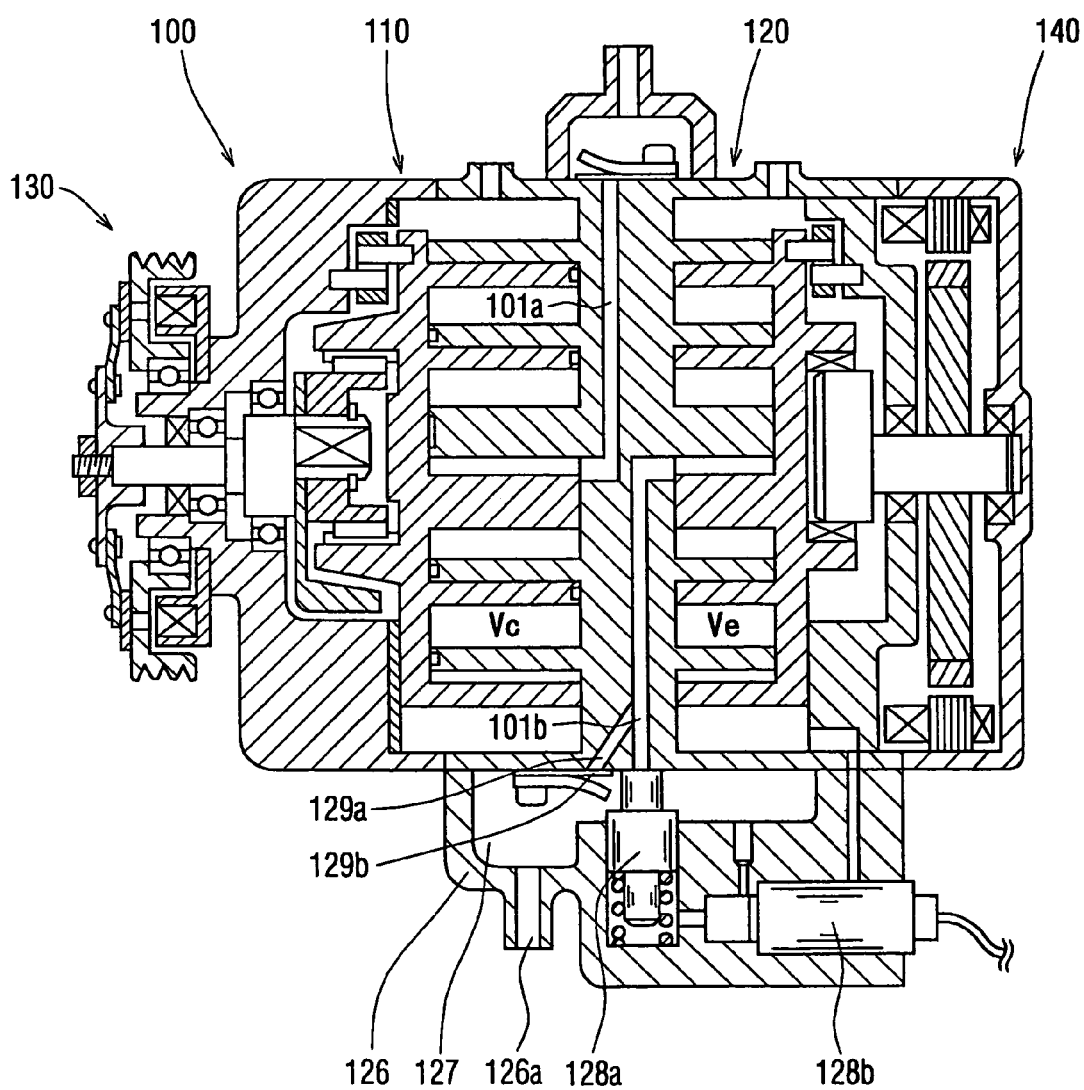
FIG. 7 is a cross sectional view showing a complex fluid machine according to a third modification to be used in the second embodiment.

In the case that the expansion device 120 is used as the compressor, a bypass discharge passage 129a and another discharge valve 129b may be provided in the fluid machine 100, as shown in FIG. 7. Namely, the bypass discharge passage 129a is provided in the base plate 101, one end of which is communicated with the expansion suction passage 101b and the other end is opened to the high pressure chamber 127. The discharge valve 129b is provided at the opening end of the bypass discharge passage 129a for preventing the compressed high pressure refrigerant from flowing back from the high pressure chamber 127 into the working chamber Ve. In this case, the opening end of the expansion suction passage 101b is closed by the electromagnetic valve 128b and the sliding valve body 128a. As a result, the compressed high pressure refrigerant can be surely pumped out from the expansion device 120 (working as the compressor).

Other Embodiments

In the above embodiments, the energy collected by the fluid machine 100 (the expansion device 120 and the electric power generating device 140) is charged into the battery. The collected energy may be charged as energy of movement by a flywheel, or as other kinetic energy such as elastic potential energy by a spring.

The fluid machine 100 of the present invention is explained as being applied to the refrigerating cycle for the automotive vehicle having the Rankine cycle. However, the use of the present invention is not limited to the automotive use.

The sliding valve body 128a and the electromagnetic valve 128b have been explained as the switching valve device 128 for opening and closing the expansion suction passage 101b.

Any other type of the switching means can be used as the switching valve device 128, and a switching valve may be provided in the fluid passage connecting the expansion inlet port 126a and the heating device 32, instead of the switching valve device 128 in the high pressure chamber 127.

What is claimed is:

1. complex fluid machine comprising:
   a compressor device for a refrigerating cycle for compressing and pumping out working fluid upon receiving a driving force from an outside driving source; and
   an expansion device for a Rankine cycle for generating a driving force by expansion of working fluid in the Rankine cycle;
   wherein the compressor device and the expansion device are formed as scroll type devices and independently operated from each other,
   each of the compressor device and the expansion device has a non-orbiting scroll, and the compressor device and the expansion device share a common base plate,
   the non-orbiting scroll of the compressor device has a first non-orbiting scroll wrap formed at and extending in one direction from the common base plate,
   the non-orbiting scroll of the expansion device has a second non-orbiting scroll wrap formed at and extending in the opposite direction from the common base plate,
   the compressor device further has a first orbiting scroll wrap intermeshed with the first non-orbiting scroll wrap to form a first working chamber, and
   the expansion device further has a second orbiting scroll wrap intermeshed with the second non-orbiting scroll wrap to form a second working chamber.

2. A complex fluid machine according to claim 1, further comprising:
   an ON-OFF switching device provided at a compressor shaft of the compressor device for connecting or disconnecting the compressor device with the outside driving source; and
   an electric power generating device provided at an expansion shaft of the expansion device.

3. A complex fluid machine according to claim 1, wherein the common base plate defines a compressor discharge passage for the compressor device and an expansion suction passage for the expansion device, and
   one end of each of the passages is opened at an outer peripheral portion of the common base plate.

4. A complex fluid machine according to claim 1, wherein the working chamber of the expansion device has maximum volume that is made smaller than that of the working chamber of the compressor device.

5. A complex fluid machine according to claim 2, wherein the electric power generating device is provided with a function of an electric motor, wherein the electric power generating device is rotated in a reversed direction when the electric power generating device is operated as the electric motor, and
   the expansion device is capable of operating as a compressor when a flow direction of the refrigerant to the expansion device is reversed by a switching device provided in the refrigerating cycle and the Rankine cycle.

6. A complex fluid machine according to claim 1, wherein the common base plate defines a compressor discharge passage for the compressor device,
   one end of the compressor discharge passage is opened at an outer peripheral portion of the common base plate, and
   the compressor discharge passage is provided with a first check valve for preventing the refrigerant from flowing back into a working chamber of the compressor device.

7. A complex fluid machine according to claim 1, wherein the common base plate defines an expansion suction passage for the expansion device,
   one end of the expansion suction passage is opened at an outer peripheral portion of the common base plate, and
   the expansion suction passage is provided with a switching valve device for opening and closing the expansion suction passage.

8. A complex fluid machine according to claim 7, wherein the switching valve device comprises:
   an electromagnetic valve controlled by a signal from an outside control device to open and close the expansion suction passage; and
   a sliding valve body moved by fluid pressures applied to both axial ends thereof, one of the fluid pressures to be applied to the sliding valve body is controlled by an on-off operation of the electromagnetic valve.

9. A complex fluid machine according to claim 7, wherein the common base plate defines a bypass discharge passage, one end of the bypass discharge passage is communicated with the expansion suction passage formed in the common base plate,
   the other end of the bypass discharge passage is opened at an outer peripheral portion of the common base plate, and
   the bypass discharge passage is provided with a second check valve for preventing the refrigerant from flowing back into the working chamber of the expansion device when the expansion device is operated as a compressor.

* * * * *